June 2, 1964   J. G. M. J. DE WOUTERS D'OPLINTER   3,135,183
PHOTOGRAPHIC CAMERA WITH FOCAL-PLANE SHUTTER
Filed July 5, 1962   7 Sheets-Sheet 1

June 2, 1964 J. G. M. J. DE WOUTERS D'OPLINTER 3,135,183
PHOTOGRAPHIC CAMERA WITH FOCAL-PLANE SHUTTER
Filed July 5, 1962 7 Sheets-Sheet 2

Inventor:
Jean Guy Marie Joseph de Wouters d'Oplinter
By Stevens, Davis, Miller & Mosher
Attorneys

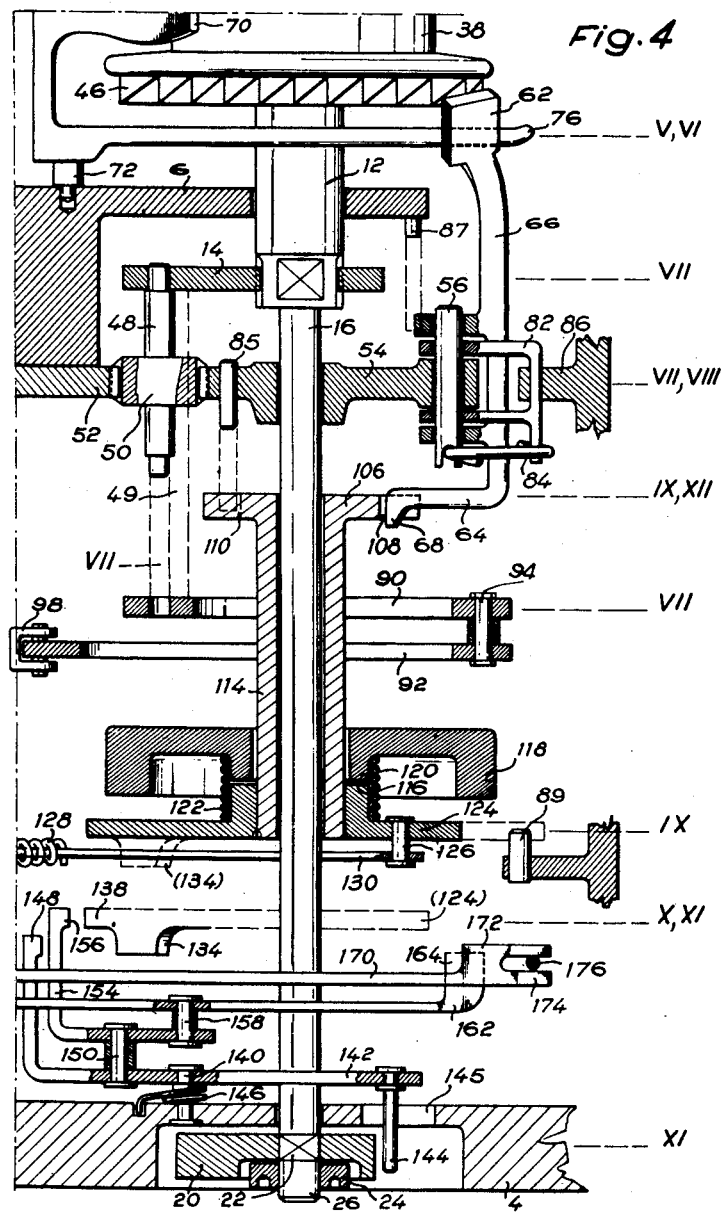

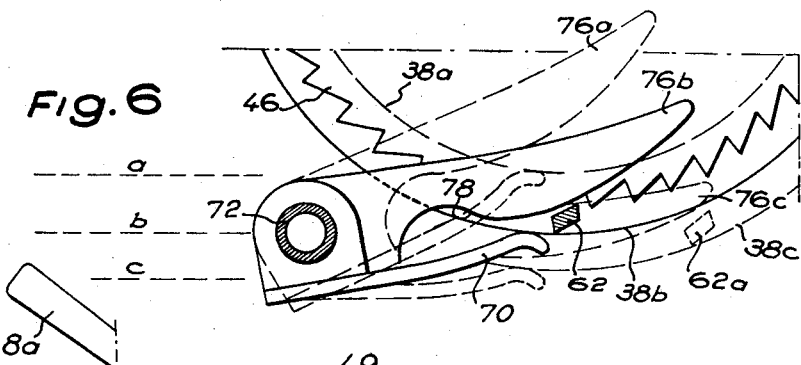
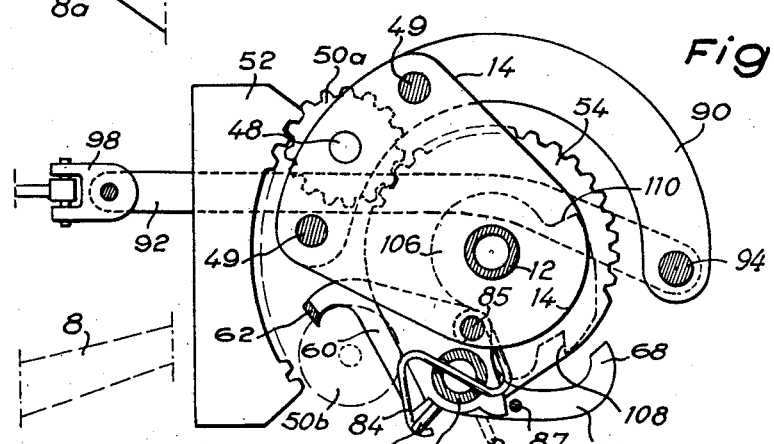
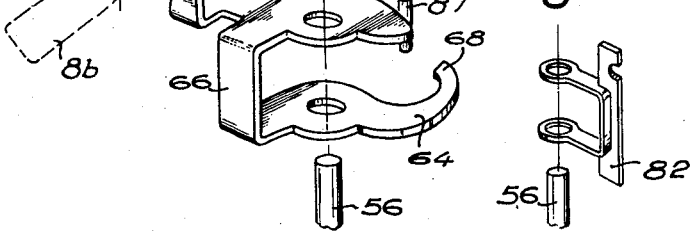
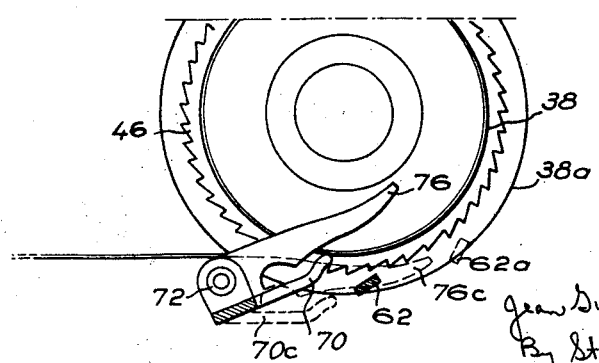

United States Patent Office 3,135,183
Patented June 2, 1964

1

3,135,183
PHOTOGRAPHIC CAMERA WITH FOCAL-PLANE SHUTTER
Jean Guy Marie Joseph de Wouters d'Oplinter, Roquefort-les-Pins, France, assignor to La Spirotechnique, Paris, France
Filed July 5, 1962, Ser. No. 207,547
Claims priority, application France July 13, 1961
16 Claims. (Cl. 95—31)

This invention relates to a combined film-winding and shutter actuating system in a photographic camera provided with a focal-plane shutter, and more particularly in a watertight submersible photographic camera.

The system according to this invention is of the type in which a single reciprocating operating lever, actuated by the user, is used for transporting the film, cocking the shutter and releasing the shutter.

It is so designed that the lever, having been operated to advance the film, does an incomplete reverse stroke and stops, in readiness to actuate a shutter releasing member through another forward stroke, and is subsequently returned by a spring, the latter movement having the effect of cocking the shutter.

The mechanism according to the invention is also characterized by the fact that the operting lever is linked to the film receiving spool by a disengageable coupling member, with varying angular travel and constant linear travel, so that the film is advanced by fractions of equal length, such a device having the advantage of allowing the use of perforated or non-perforated film at will.

One embodiment of the device according to the invention is featured by the fact that the main parts of the mechanism are assembled on two coaxial shafts; such a device offers a remarkably simple and sturdy structure, and, in the case of a watertight submersible camera, makes it very easy to achieve complete watertightness between the external control members and the inner mechanism of the camera.

Other novel features of the mechanism according to the invention will appear in the following description, with reference to the appended drawing, in which:

FIG. 4 is an expanded view of the lower part of FIG. 3.

FIG. 5 is a diagrammatic plane view along V (FIG. 4) showing the pawl-and-ratchet device with varying angular travel and constant linear travel.

FIG. 6 is an enlarged detail of FIG. 5.

FIG. 7 is a diagrammatic plane view along VII (FIG. 4) showing the epicycloid gear, the shutter-cocking crank, and the film-driving pawl actuated by the planetary gear.

FIG. 8 is a perspective view of the pawl on FIG. 7 and of its pilot lug.

Figure 1:
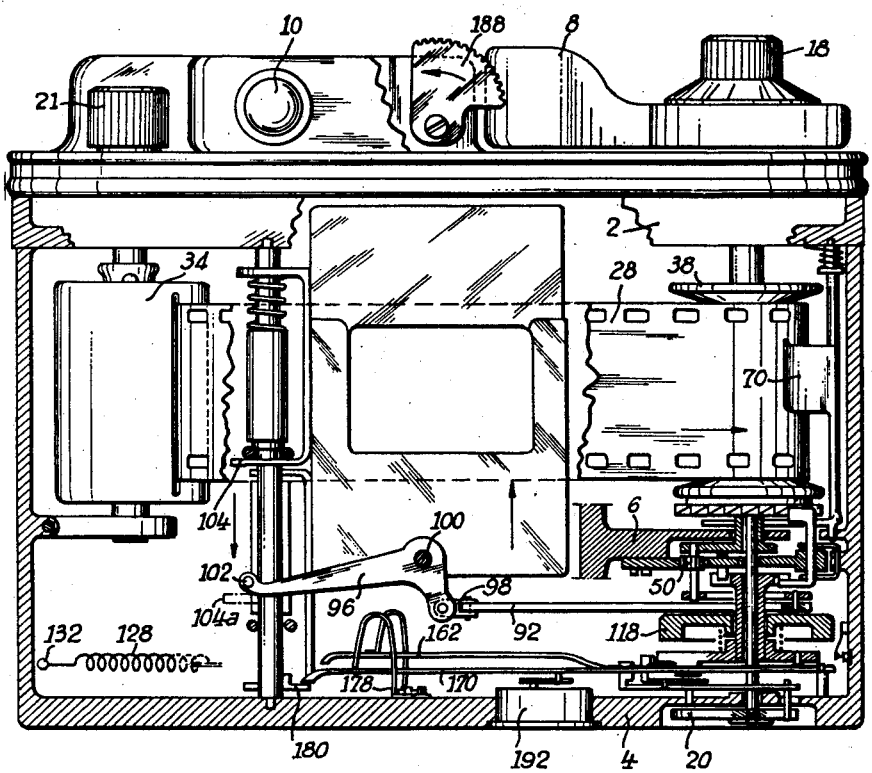
FIG. 1 is a general elevation of a camera fitted with the mechanism according to the invention, seen from the back.
Figure 2:
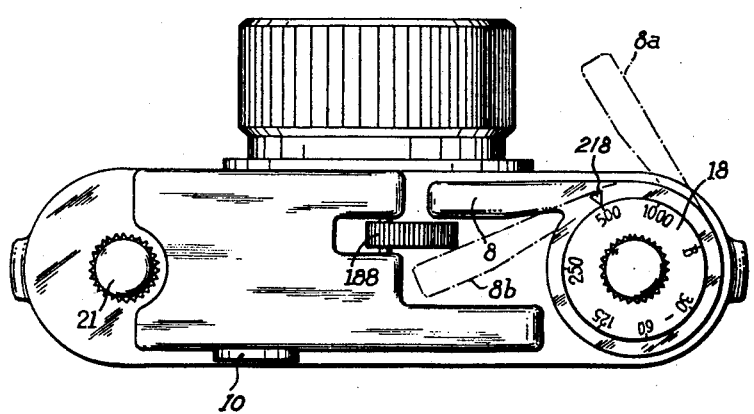
FIG. 2 is a plane view of the same camera, seen from above.

Referring to FIG. 1 and FIG. 2, the film-transporting and shutter-actuating system is held between upper flange

2

Figure 3:
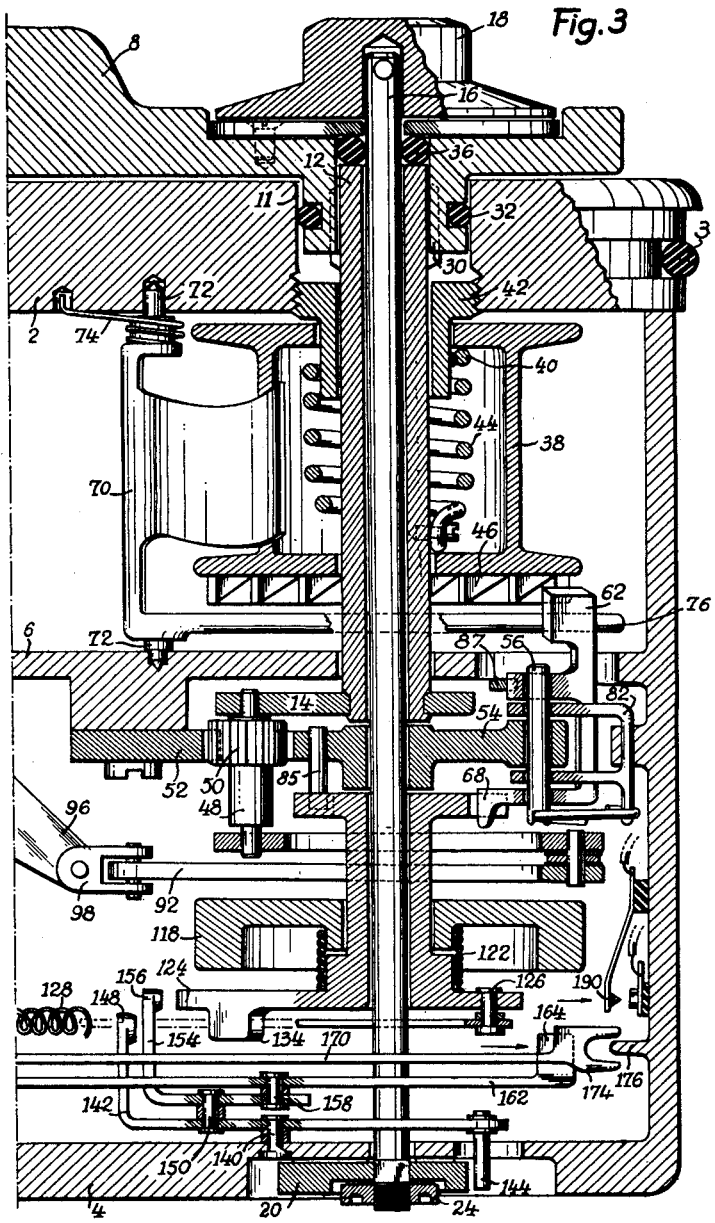
FIG. 3 is an enlarged elevation, with part cut-aways, of the mechanism according to the invention.

2 and lower flange 4 of a rigid frame. This frame can be integral with the watertight lid of a submersible camera, the said lid being surrounded by an elastic O-ring gasket shown in 3 (FIG. 3). Such a camera is the subject of the application for a U.S. patent application S.N. 82,927 filed on January 16, 1961 by the applicant.

On the top of cover-plate 2 is an actuating lever 8, which moves between two extreme angular positions shown in dashed lines on FIG. 2. Coaxial with the hub of lever 8 is a knurled knob 18 used for the control of exposure time. This knob 18 drives a spiral cam 20 lodged in a recess of lower flange 4 of the frame. The part played by this cam is to be explained hereafter with reference to FIG. 11.

The cover-plate 2 also carries a viewfinder 10, a film rewinding knob 21, and a latch 188 for locking lever 8, so as to prevent an unvoluntary release of the shutter: when this lever occupies the central position shown on FIG. 2 (full lines), the shutter is cocked, and a slight pressure, bringing the lever to 8b, is enough to release the shutter.

FIG. 1 also shows a film 28 unwinding between a delivering cassette 34 and a receiving spool 38. This film moves behind the blades or slides of a focal-plane shutter, which is advantageously, but not necessarily, of the type described in the application for a U.S. patent application S.N. 125,431 filed on July 20, 1961 by the applicant, which will be issued November 5, 1963 as Patent No. 3,109,357.

During their exposing stroke, both the rigid blades of the shutter move upward, i.e. they go from lower platen 4 towards upper flange 2. They are guided by a small upright fixed between flanges 2 and 4. The blades are cocked through a cocking rod 92, which is actuated by control lever 8 in a manner to be described hereafter with reference to FIGS. 3 and 7. This rod 92 actuates a linkage 96, pivoted on a stationary pivot 100. This linkage is provided with a dog 102 engaging the yoke 104 of the upper blade to lower both blades, which are then held in the cocked position by two trigger rods 162 and 170. The operation of these trigger rods is to be explained hereafter with reference to FIG. 10. At the bottom of FIG. 1 is also seen an exposure counter 192, inserted into lower flange 4. This counter, of any appropriate type, may be actuated for instance by one of the shutter-releasing trigger rods.

FIGS. 3 and 4 show in greater detail the elements of the mechanism according to the invention. The proportions of both, especially FIG. 4, have been altered to make the drawing easier to read.

In FIG. 3, lever 8 is keyed, through grooves 30, to a tubular shaft 12, guided at its lower end by a bearing machined in an inner rib 6 of the mechanism's housing. On the lower end of the hollow shaft 12 is keyed a radial arm 14: the part played by this arm is to be explained hereafter. The hub of lever 8 is guided in a bearing 11 of upper flange 2. This hub fitted with an O-ring 32 which provides an effective seal. Inside the hollow shaft 12 runs a coaxial shaft 16, at the upper end of which is fixed a knurled knob 18, which shows the times of exposure opposite an index 218 etched on the hub of lever 8 and visible on FIGS. 2 and 11. An O-ring 36 on shaft 16 provides an effective seal between this shaft and hollow shaft 12. Shaft 16 actuates, through its lower end, spiral cam 20 for exposure control. This cam is also shown on FIG. 11. It is drivable by a flat 22 on shaft 16, visible on FIG. 4, and is locked on the said shaft by a nut 24.

The film-receiving spool 38 runs freely around hollow shaft 12 and around a stationary bushing 42 screwed into upper platen 2. This bushing supports one end 40 of a helical spring 44, housed inside the spool, the other end of which is fixed to hollow shaft 12; this spring acts as the return spring for shaft 12 and lever 8. It tends to pull lever 8 back towards its outer position 8a (shown on FIG. 2) while cocking the shutter in the way to be described hereafter, with reference to FIGS. 4 and 7: radial arm 14 is rigidly linked through braces 49 to a crank 90, which actuates the shutter cocking rod 92. Braces 49 are on either side of the satellite gear 50, as shown in cross section on FIG. 7. This gear 50 is idle on an axle 48, maintained between radial arm 14 and crank 90. It rolls in engagement with an internally toothed sector 52 fixed on rib 6 of the frame, and drives, according to a multiplying epicycle motion, a planetary toothed sector 54, which turns freely on axle 16, between radial arm 14 and cocking crank 90.

The planetary sector 54 fulfills several important functions, and is one of the essential members of the mechanism according to the invention.

Figures 9, 10:
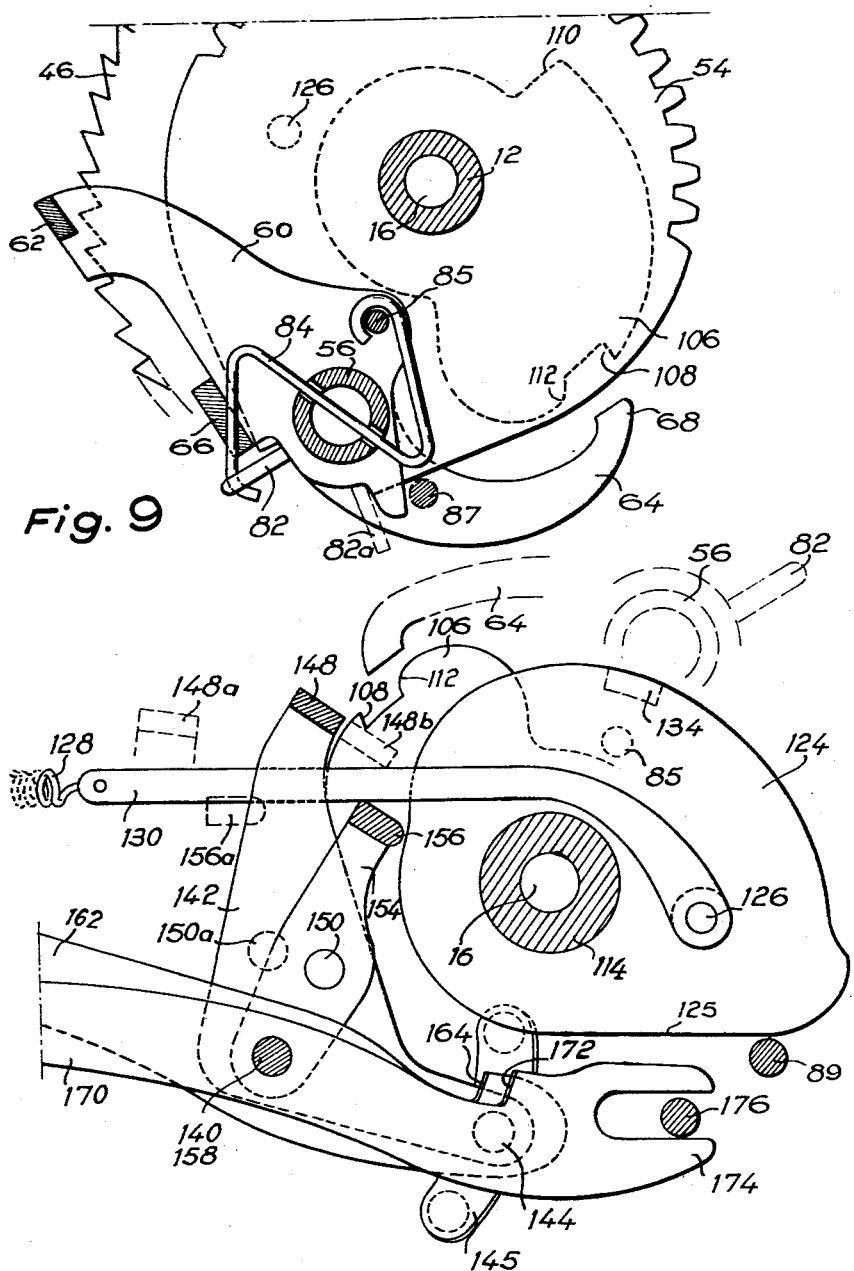
FIG. 9 is a schematic plane view along IX (FIG. 4) of the planetary gear, pawl, pilot lug and notched sector.
FIG. 10 is a schematic plane view along X (FIG. 4) of the crank-disc actuated by the notched sector and actuating the trigger-rods for releasing the shutter.

Its operation is readily understood from FIGS. 4, 7 and 9, as well as from FIGS. 12–15.

Planetary 54 is first of all a driving member for the cocking of the shutter releasing spring 128, visible to the left bottom of FIG. 1. This spring is tensioned between a stud 132 fixed on the frame and a crosshead 130, visible on FIG. 10, which is pivoted on a crankpin 126 fixed under a revolving disc 124. This disc is keyed on a hub 114, which links it to a notched sector 106 just below planetary 54, so that the assembly of sector 106, hub 114 and disc 124 moves as one part. This assembly can be made integral, as shown on FIG. 3.

The underside of planetary 54 carries a stud 85. When the planetary turns clockwise (seen from above as on FIG. 15), stud 85 meets a notch 110 of sector 106, and drives this sector, as well as disc 124, which is keyed to the latter.

Disc 124 in turn drives crosshead 130 through its crankpin 126, stretching the trigger spring 128 until crankpin 126 overshoots its dead-center point; disc 124 then meets a stationary stop 89 (FIG. 10) against which it is applied by the tension of spring 128.

Planetary 54 also takes part in two other functions: the advance of the film by equal lengths, and the shutter release.

For both functions, the planetary is provided with a pin 56, through which it drives in rotation around axle 16 a rocker pawl 66 shown in perspective on FIG. 8. This pawl freely oscillates on pin 56. It is associated with a pilot lug 82, also shown in perspective on FIG. 8, which controls the oscillations of the said rocker pawl. Lug 82 is biased by a Z-spring 84 (FIG. 9), which prevents lug 82 from remaining in its middle position and forces it to pull the pawl one way or the other, with a snap action. Lug 82 alternatively meets two stationary end stops (86 on FIG. 4 and a second and similar stop, not shown), which tilt it alternatively together with the rocker pawl.

Pawl 66 is provided at its upper end with a tooth 62, which engages a ratchet wheel 46, keyed to the receiving spool 38. This pawl is provided at its lower end with a curved tooth 68, which engages a notch 108 on notched sector 106. This tooth 68 is an intermediate driving member for the shutter release system, as it drives sector 106 and disc 124 until crankpin 126 of disc 124 overshoots its dead center again, freeing spring 128, which then drives disc 124 and enables it to actuate trigger rods 162 and 170. At the moment of release, the rocker pawl meets a stationary stop 87 (FIG. 9), which tilts it, lifting tooth 68 of the pawl out of notch 106 on sector 108.

It was mentioned earlier that tooth 62 of the pawl transported the film by driving spool 38 through its ratchet wheel 46. This motion, according to the invention, occurs with constant linear travel, and thus with varying angular travel.

To this end, pawl 66 plays the part of a disengageable coupling member between planetary 54, rotated by lever 8, and ratchet wheel 46. According to the invention, a feeler arm 70 (FIGS. 3–6), turning on two pivots 72 held by upper flange 4 and intermediate rib 6, is pulled by a small spring 74 (FIG. 3) so as to apply constantly on the film roll wound around receiving spool 38. The arcuate part 76 of the feeler arm, when the latter revolves around pivots 72, lifts tooth 62 of the pawl, during a variable fraction of the pawl's travel, thus more or less delaying the engagement of the pawl with the teeth of ratchet wheel 46, keyed to spool 38. Referring to FIG. 6, it is readily seen that when the diameter of wound film increases from *a* to *b*, then from *b* to *c*, cam 76 moves from 76a to 76b, then from 76b to 76c, thus increasingly delaying the engagement of pawl 62 with the teeth of ratchet wheel 46. Thus, this device marks a definite improvement over known devices, of the type with varying angular travel of the receiving spool, in which the variation of the angular travel is based on a theoretical relation which obtains only for a given thickness of the film, whereas in the mechanism according to the invention, the angular travel is based on the spool's true diameter.

Moreover, it should be noticed that the mechanism according to the invention may be used both with perforated and nonperforated film, whereas known devices generally use the perforations to ensure uniform advance of the film.

Referring again to FIG. 6, it will be noticed that race 76 bears a second hump 78, which lifts tooth 62 of the pawl at the end of its travel, thus releasing the spool and making it possible to rewind the film at will after each exposure.

The third function of planetary 54, as briefly mentioned earlier, controls the release of the shutter, through the lower tooth 68 of pawl 66, engaging notch 108 of notched sector 106.

This function is better understood through reference to diagrammatic FIGS. 12–15, which show four successive phases of the mechanism's working.

Figure 15:
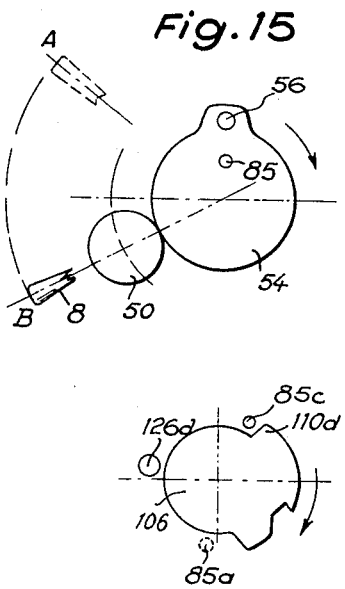

Supposing first that lever 8 is in position 8A (FIG. 12), i.e. pushed out, ready to be actuated for film advance, it may be seen that notched sector 106 is in the cocked position of the release spring 128, this spring having been cocked in the last phase of the previous cycle, to be described with FIG. 15. Crankpin 126 for cocking spring 128 is at the right of the axis of rotation, just beyond its dead center point. As pointed out earlier, crankpin 126 is fastened to the underside of disc 124, visible on FIG. 13, and is therefore keyed to notched sector 106 and rotates with said sector around the main axis of the mechanism.

Figure 12:
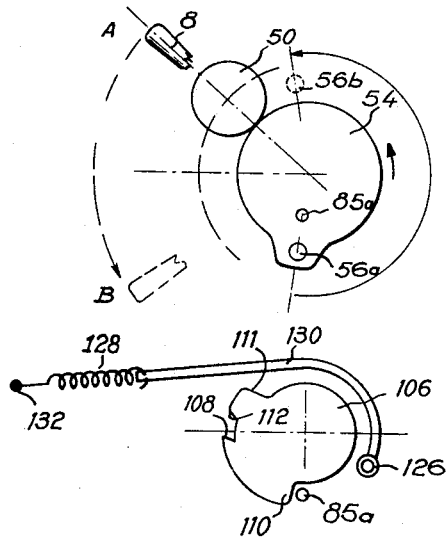
FIGS. 12-15 are schematic plane views along XI (FIG. 4) of the actuating lever, planetary gear, sector and crank-disc in various positions.
Figure 13:
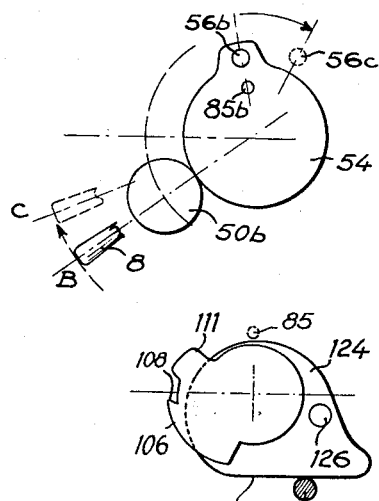

During the advance of the film, shown on FIG. 12, lever 8, initially extended in 8A, is completely depressed by the operator to 8B. This brings satellite 50 to 50B (FIG. 13). Satellite 50 in turn drives planetary 54. It may be seen on FIG. 12 that pivot 56 of the pawl goes from 56A to 56B, driving the receiving spool 38 along an angular travel corresponding to the width of one exposure.

Referring now to FIG. 13, it may be seen that lever 8 then reverses slightly from 8B to 8C.

The sector-disc assembly remains stationary, being held by stationary stop 89 through a flat 125 on disc 124. Meanwhile, the planetary reverses slightly, the pawl's pivot coming to 56C, where tooth 68 on the pawl engages notch 108 of sector 106, where it comes to a stop, holding the planetary and therefore the lever in position 8C.

Figure 14:
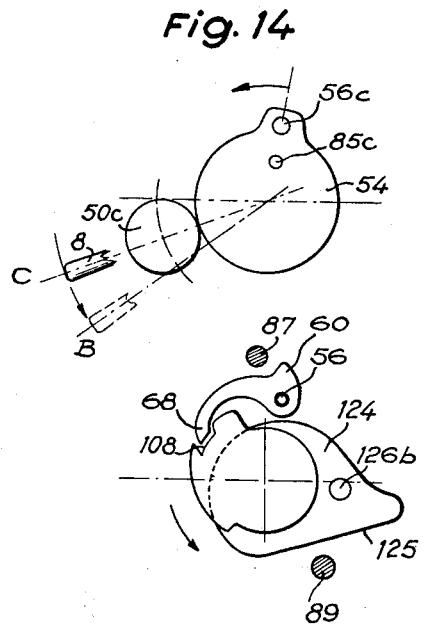

FIG. 14 shows the shutter release phase: the operator presses lever 8 from 8C to 8B. The pawl's pivot returns to 56B, and tooth 68 of the pawl drives the sector until crankpin 126 of the release spring reaches 126b, beyond its dead center point. At the same moment, the pawl meets a stationary stop 87, which tilts it, lifting tooth 68 clear of notch 108 of the sector, which releases the sector, thus rotating the crank disc, the crankpin of which reaches 126d (FIG. 15), while the pawl is freed. The rotation of disc 124 frees the shutter blades, through trigger rods 162 and 170, visible on FIGS. 1, 3, 4 and 10. The action of disc 124 on the trigger rods is to be described in detail hereafter.

Since the shutter-release operation has the effect of freeing the spool-driving pawl, the pawl-planetary-lever assembly reverses from 8B to 8A, as shown FIG. 15, under the action of the return spring of lever 8 (44, FIG. 3) inside receiving spool 38. At the beginning of the reverse stroke, stud 85 of the planetary meets notch 110 of the sector, which has been moving up to it to position 110D (FIG. 15), due to the rotation of the sector-disc assembly during the release phase. The planetary goes on rotating, drives sector and disc through its stud 85, and brings them back to the cocking position, as shown on FIGS. 10 and 13.

Table I below gives a simplified recapitulation of the three phases which correspond to the motions of the lever, the sequences of members driven by the lever being shown diagrammatically.

It should be observed that the first phase, which corresponds to the advance of the film, may be split into an advance phase proper followed by the short return stroke of the lever, from B to C, and by its automatic locking in position C. The third phase (cocking) is in fact entirely automatic, from the moment the operator releases the lever after shooting a picture, so that there are two active phases only for the operator: (1) film-advance, (2) release.

*Table I*

| 1st phase—Film advance | 2nd phase—Release | 3rd phase—Cocking |
|---|---|---|
| Lever 8 | Lever 8 | Lever 8 |
| from A to B, | from C to B | from B to A |
| then from B to C | 12 | 12 |
| hollow shaft 12 | 14 | 14 |
| arm 14 | 50 | 50     90 |
| satellite 50 | 54 | 54     92 |
| planetary 54 | pawl | pawl   96 |
| pawl | 68 | (stud 85)   blades |
| 62      68 | sector 106 driven by 108 then disengaged | sector 106 driven by 110 |
| spool   sector 106 (automatic locking of 68 with 108) | disc 124 | 124 |
|  | trigger rods | spring 128 |
|  | blades |  |

Figure 11:
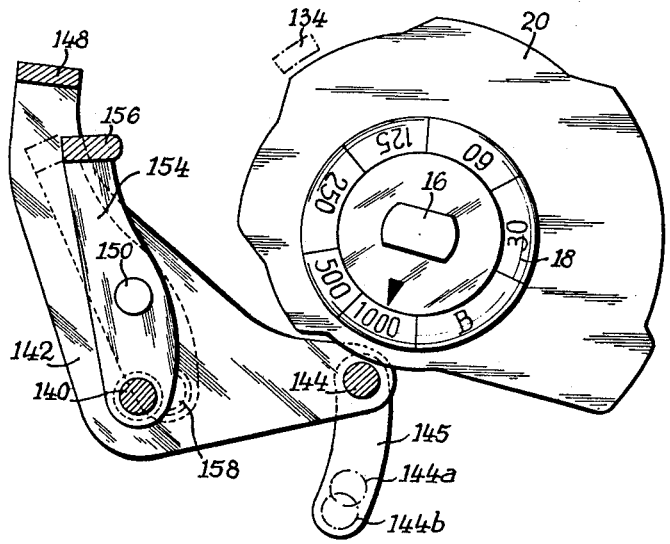
FIG. 11 is a schematic plane view along XI (FIG. 4) of the exposure-timing cam.

The description shall now be given of the shutter release mechanism proper, for which one should refer first to FIG. 3, then to FIGS. 10 and 11.

Release disc 124, already briefly described, bears at its circumference a cam-shaped race, which can engage a dog 156 on rocker arm 154. This rocker arm is linked, through pivot 158, to trigger rod 162, which holds back the first shutter blade. It is also pivoted, through pivot 150, on a rocker-arm holder 142 shaped like a bent lever, which turns on stationary pivot 140. One of the arms of holder 142 carries a pin 144 which engages spiral cam 20 for the control of exposure time. This cam is shown in detail on FIG. 11. Pin 144 of lever 142 is applied against cam 20 by a small return spring 146 (FIG. 4). The second arm of lever 142 carries a dog 148, the part played by which is to be explained hereafter. The orientation of the rocker arm and lever assembly around pivot 140 controls the time of exposure, in a way to be explained hereafter.

Referring again to FIG. 3, it will be observed that the underside of disc 124 carries a lug 134. It will also be observed that both trigger rods have notched ends (164 on rod 162, 172 on rod 170) on the path of lug 134, so that they can be driven by this lug to release both shutter blades sequentially. These trigger rods are guided, trigger rod 162 by pivot 158 on the rocker arm, trigger rod 170 by a runway 174, which slides on a stationary lug 176. Both are besides jointly guided and biased into their locked position by a double hairpin spring 178 (FIG. 1), so that, in the cocked position, trigger rod 170 holds back the second shutter blade through a dog 180, attached to the blade's guiding yoke. The same obtains for trigger rod 162, shown on FIG. 1 in the released position, with the first shutter blade at the end of its travel.

Referring to FIG. 10, it will be observed that notches 164 and 172 of both trigger rods are slightly staggered. Thus, when disc 124 is released, and is driven by spring 128, its lug 134 meets both trigger rods in rapid succession, which produces a very short exposure, $\frac{1}{1000}$ of a second for instance, the shorter as the disc has then reached its maximum angular speed.

However, trigger rod 162 can also be released otherwise, through rocker arm 154, for longer exposures. Comparing FIGS. 10 and 11, it will be observed on FIG. 11 that dog 156 on the rocker arm is outside the path of lug 134 on the disc. This corresponds to the shortest exposure. On FIG. 10, on the other hand, the rocker arm and its associated lever 142 have a different position, and the dog of rocker arm 156 is on the path of the peripheral race of disc 124. The result is that the race meets the dog at a point more or less distant from the beginning of the disc's angular travel, according to the orientation of lever 142, carrying the rocker arm, this orientation being controlled by spiral cam 20. On FIG. 10 is shown in dashed lines the first extreme position 156a of the rocker arm's dog, the dog being clear of the travel of the rim of disc 124. This position corresponds to the shortest exposure. The other extreme position of the rocker arm and holder assembly corresponds to time-exposure.

Pin 144 of the rocker arm carrying lever 142 is pushed back by boss B of cam 20 to its lowest position 144B, and dog 148 of the rocker arm holder comes to 148B (FIG. 10) on the path of lug 134 of the disc. The result is that the rim of the disc first meets dog 156 of the rocker arm, which oscillates around pivot 150 (linking it with the rocker arm) and drives trigger rod 162 to the right of the drawing, releasing the first shutter blade. Immediately after, lug 134 meets dog 148 of the rocker arm holder, and stops against it. The shutter remains open until the photographer releases lever 8, which then drives cam 20 through friction with knob 18. Cam 20 slightly pushes the rocker arm holder 142 outside the path of lug 134, which allows the latter to escape and complete its stroke, where it meets notch 172 of the second trigger rod, which it actuates so as to release the second shutter blade, thus closing the shutter.

The mechanism according to this invention is also featured by the presence of a fly-wheel 118 (FIG. 3), coupled to disc 124 through a free-wheeling device 122. This wheel stores energy during the slackening of release spring 128, reducing the disc's acceleration, which make long exposures possible and more uniform; it then gradually restitutes that energy while the disc drives the trigger rods, and finally dissipates, gradually and smoothly, the residual kinetic energy of the releasing members through the friction of the free-wheeling device.

Also according to the invention, the free-wheeling link between the fly-wheel and the releasing disc includes a helical spring 122, tightly wound both on the hub of the fly-wheel (120, FIG. 4) and on the hub of the disc (116, FIG. 4). This ensures driving, in one direction through locking of the spring, and friction in the opposite direction.

Finally, disc 124 is conveniently used to control a flash-lamp contact (199, FIG. 3).

What I claim is:

1. A photographic camera provided with a focal plane shutter and with a single reciprocating operating lever having a long stroke effective for transporting the film and cocking the shutter, and a short stroke taking place in the same direction as the said long stroke, effective for releasing the shutter, said camera comprising the following features, in combination:
   (a) the operating lever is provided with a hollow shaft coaxial with the film take-up spool, said shaft being connected with said spool by a step-up gear,
   (b) a central shaft coaxial in said hollow shaft carries respectively, on its two ends, a control knob for adjusting the duration of an exposure, said knob having a reading face in registry with an index carried on the hub of said lever, and a spiral cam effective for adjusting the duration of an exposure, said cam being operatively in mesh with a shutter release device,
   (c) the hollow shaft of the operating lever carries a radial arm which is linked by a crank to a shutter cocking rod, said arm further being an intermediary driving member for the take-up spool and also being an intermediary member effective (1) for cocking a shutter release spring and (2) for releasing the shutter.

2. A photographic camera according to claim 1, in which the operating lever is positioned in such manner that its short stroke is directed substantially parallel to the optical axis of the camera, so as to minimize the risk of imparting transverse motion to the camera while shooting a picture.

3. A photographic camera according to claim 1, in which the step-up geared driving device of the take-up spool comprises an epicycloid gear consisting of a satellite pinion carried by the radial arm on the shaft of the operating lever, said pinion meshing with a stationary internal gear and with a planetary gear, said planetary gear being coaxial with said operating shaft and being linked with the take-up spool by a linkage which is automatically releasable after each exposure, in such manner that the film may be wound back at will after each exposure.

4. A photographic camera according to claim 1, in which the linkage for driving the take-up spool is also automatically releasable during a gradually increasing fraction of the long stroke of the operating lever, in relationship with the amount of film taken-up on said spool, so that the film is transported by fractions of constant length.

5. A photographic camera according to claim 1, in which the driving linkage of the film take-up spool comprises:
   (a) a rocker pawl pivotally carried by a pin on the planetary gear, said pawl being provided with a tooth meshing with a ratchet wheel on said spool,
   (b) a pilot lug also pivotally carried by said pin on said planetary gear, said lug being operatively connected with said pawl for rocking said pawl about said pin, said lug being alternatively biased by a spring towards either of two stable terminal positions, upon said lug hitting either of two stationary terminal abutments,
   (c) a feeler arm spring-loaded for pressing upon the take-up spool and for measuring the thickness of said spool, and an arcuate arm drivable by said feeler arm, said arcuate arm being engageable by said rocker pawl for disengaging said pawl from said ratchet wheel during an increasing portion of the stroke of said planetary gear as the spool fills up.

6. A camera according to claim 5, in which the arcuate arm is provised with a nose effective for disengaging the spool-driving pawl from the ratchet of said spool upon termination of a spool-driving stroke of said pawl, so as to permit rewinding of the film at any time after an exposure.

7. A camera according to claim 1, in which the return stroke of the operating lever after the shutter-releasing short stroke is used for cocking the shutter by using the power of the return spring of said lever.

8. A camera according to claim 1, in which the focal plane shutter comprises two blades releasable in succession respectively by two trigger rods, the shutter release device of said camera comprising:
   (a) a pin on the planetary gear, engageable, upon rotation of said planetary, with a first notch on the rim of a notched disk having a hub rotatable about the central shaft of the device, for driving said disk,
   (b) a fly-wheel freely rotatable about said hub, said fly-wheel having a free-wheel linkage with a crank-disk keyed on said hub, said crank-disk carrying a pin on which one end of a crank is rotatable, while the other end of said crank forms the mobile anchoring point for the shutter-release spring,
   (c) said crank-disk abuts against a stationary abutment in a position such that the crankpin is slightly beyond its dead-center which corresponds to the point of maximum tension of spring,
   (d) the rocker pawl is provided with a second tooth oriented opposite to the first spool-driving tooth of of said pawl, relatively to the central pin of said pawl, said second tooth being engageable with a second notch of said notched disk during the return stroke of the operating lever after the film-winding long stroke of said lever, so as to restrict the said return stroke and to hold the notched disk and therefore the crank-plate in the cocked position of the shutter-release spring,
   (e) said second tooth of the rocker pawl is engageable, during the shutter-release action, with said notch of said notched disk until the crank-pin of the crank-plate overshoots the dead-center point of maximum tension of spring, liberating said spring which then drives the crank plate, while the rocker-pawl hits a stationary abutment effective for rocking said pawl and disengaging its tooth out of the notch of disk, thereby permitting full-length return stroke of planetary gear and therefore of lever (which returns to 8A and is then ready for a new film-winding forward long stroke),
   (f) the crank-plate has a rim of increasing radius for indirectly actuating the first shutter-releasing trigger rod for releasing the first shutter blade and further carries a projection for directly actuating either the second of said trigger rods in slow exposures, or both of said rods in high-speed exposures.

9. A camera according to claim 8, in which the fly-wheel is further frictionally linked to the crank-plate so that said fly-wheel may store kinetic energy during the release of the shutter-release spring, and may then release said energy gradually during actuation of the shutter-release trigger system, and may finally dissipate gradually and smoothly the residual kinetic energy of said system after triggering.

10. A camera according to claim 9, in which the fly-wheel is linked to the crank-plate by a tightly wound helical spring wound in resilient frictional engagement upon the hub of said fly-wheel and upon the hub of said crank plate, thereby achieving a free-wheeling frictional linkage.

11. A camera according to claim 8, in which the shutter-release system comprises:
   (a) on the path of the rim of the spiral cam for adjusting the duration of an exposure, a pin carried on one end of a lever reciprocable about a central stationary pivot said lever carrying on its other end a second pin on which is pivoted a rocker arm linked with said trigger rod by a third pivot which is located, when at rest, in axial registry with the central stationary pivot of lever, thereby permitting said lever and said rocker arm to reciprocate about said stationary pivot without altering the position of said first trigger rod, (b) on the first trigger rod a notch located on the path of a tooth carried on the lower face of the crank-plate, and on the second trigger rod cooperating with the second shutter blade, a similar notch located, when at rest, at a very short distance behind notch of first trigger rod relatively to the path of tooth, (c) the rocker arm carries on its end opposite to pivot a finger engageable by the rim of crank-plate, said finger being reciprocable towards and away from the center of said plate according to the position imparted to rocker arm by lever as said lever is driven by cam, engagement of finger by plate being effective for rocking arm and releasing the first trigger rod after a certain angular stroke of plate adjustable by the action of cam upon rocker arm the second shutter blade being subsequently released by tooth of crank-plate hitting the notch of the second trigger rod, (d) the rocker arm reciprocates between two terminal positions, determined by cam, one terminal position corresponding to the shortest exposure time, finger of rocker arm then being fully offset outside of the path of the rim of plate, so that plate will act only through its tooth hitting the notches of both trigger rods in quick succession, (e) the other terminal position of rocker arm is for time-exposures, lever being provided with a finger which, in the time-exposure position of lever occupies a position on the path of tooth of the crank-plate, in such manner as to stop said plate after the first trigger rod has been released (by action of the rim of plate upon the rocker arm finger), said plate being subsequently releaseable by the shaft of the spiral cam being frictionally driven by the operating lever on its return stroke as said lever is released by the operator, when said cam drives the rocker arm finger out of engagement with tooth, so that plate is released and may terminate its stroke and actuate second trigger rod for reclosing the shutter.

12. A camera according to claim 8, provided with an electric contact member for actuating a flash lamp synchronously with the shutter, said contact member being engageable by a boss on the rim of the crank-plate.

13. A camera according to claim 8, provided with an exposure counter, the actuating member of said counter being engageable by one of the shutter trigger rods.

14. A camera according to claim 8, in which each shutter trigger rod is resiliently supported by a hair-pin spring biasing said rod into engagement with a nose of the corresponding shutter blade.

15. A camera according to claim 1, provided with a safety catch manually engageable on the path of operating lever for preventing unvoluntary release of the shutter.

16. A photographic camera provided with a focal plane shutter and with a single reciprocating operating lever having a long forward stroke effective for transporting the film, a short stroke, taking place in the same direction as the said long stroke, effective for releasing the shutter, and an automatic return stroke effective for cocking the shutter, said camera further comprising, in combination:

(a) A hollow shaft drivable by said operating lever, coaxial with the film take-up spool and connected with said spool by a step-up gear, (b) a central shaft coaxial in said hollow shaft, carrying respectively, on its two ends, a time-setting knob, and a time-setting spiral cam cooperating with the shutter release device, (c) on the hollow shaft of the operating lever, a radial arm linked by a crank to a shutter cocking rod, (d) a driving linkage of said lever with the film take-up spool comprising:
  (1) a satellite pinion carried by the radial arm on the shaft of the operating lever said pinion meshing with a stationary internal gear and with a planetary gear coaxial with said operating shaft, and drivable by said pinion,
  (2) a rocker pawl pivotally carried by a pin on the planetary gear, said pawl being provided with a tooth meshing with a ratchet wheel on said spool
  (3) a pilot lug also pivotally carried by said pin on said planetary gear, said lug being operatively connected with said pawl for rocking said pawl about said pin, said lug being alternatively biased by a spring towards either of two stable terminal positions, upon said lug hitting either of two stationary terminal abutments
  (4) a feeler arm spring-loaded for pressing upon the take-up spool and for measuring the thickness of said spool, and an arcuate arm drivable by said feeler arm, said arcuate arm being engageable by said rocker pawl for disengaging said pawl from said ratchet wheel during an increasing portion of the stroke of said planetary gear as the spool fills up, the arcuate arm being further provided with a boss effective for disengaging the spool-driving pawl from the ratchet of said spool upon termination of a spool-driving stroke of said pawl, so as to permit rewinding of the film at any time after an exposure, (e) A focal-plane shutter comprising two blades releasable in succession respectively by two trigger rods, in combination with a shutter release device comprising:
  (1) a pin on the planetary gear, engageable, upon rotation of said planetary, with a first notch on the rim of a notched disk having a hub rotatable about the central shaft of the device, for driving said disk,
  (2) a fly-wheel freely rotatable about said hub, said fly-wheel having a free-wheel and frictional linkage with a crank-disk keyed on said hub, said crank-disk carrying a pin on which one end of a crank is rotatable, while the other end of said crank forms the mobile anchoring point for the shutter-release spring, the linkage of said fly-wheel with said crank-disc comprising a closely wound helical spring wound in resilient frictional engagement upon the hub of said fly-wheel and upon the hub of said disk.
  (3) a stationary abutment holding said crank-disc in a position such that the crank-pin is slightly beyond its dead-center which corresponds to the point of maximum tension of spring,
  (4) on the rocker pawl a second tooth oriented opposite to the first spool-driving tooth of said pawl, relatively to the central pin of said pawl, said second tooth being engageable with a second notch of said notched disk during the return stroke of the operating lever after the film-winding long stroke of said lever, so as to restrict the said return stroke and to hold the notched disk and therefore the crank-plate in the cocked position of the shutter-release spring, said second tooth of the rocker pawl being engageable, during the shutter-release action, with said notch of said notched disk until the crank-pin of the crank-plate overshoots the dead-center point of maximum tension of spring, liberating said spring which then drives the crank-plate, while the rocker-pawl hits a stationary abutment effective for rocking said pawl and disengaging its tooth out of the notch of disk, for allowing a full-length return stroke of planetary gear and operating lever, the crank-plate having a rim of increasing radius for indirectly actuating the first shutter-releasing trigger rod for releasing the first shutter blade and further carrying a projection for directly actuating either the second of said trigger rods in slow exposures, or both of said rods in high-speed exposures.

(5) on the path of the rim of the spiral cam for adjusting the duration of an exposure, a pin carried on one end of a lever reciprocable about a central stationary pivot said lever carrying on its other end a second pin on which is pivoted a rocker arm linked with said trigger rod by a third pivot which is located, when at rest, in axial registry with the central stationary pivot of the lever, so as to enable said lever and said rocker arm to reciprocate about said stationary pivot without altering the position of said first trigger rod, (6) on the first trigger rod a notch on the path of a tooth carried on the lower face of the crank-plate, and on the second trigger rod co-operating with the second shutter blade, a similar notch located, when at rest, at a very short distance behind notch of first trigger rod relatively to the path of tooth, (7) on the end of the rocker arm, opposite to pivot a finger engageable by the rim of crank-plate, said finger being reciprocable towards and away from the center of said plate according to the position imparted to rocker arm by lever as said lever is driven by cam, engagement of finger by plate being effective for rocking arm and releasing the first trigger rod after a certain angular stroke of plate adjustable by the action of cam upon rocker arm, the second shutter blade being subsequently released by tooth of crank-plate hitting the notch of the second trigger rod; the rocker arm being reciprocable between two terminal positions, determined by cam, one terminal position corresponding to the shortest exposure time, finger of rocker arm then being fully offset outside of the path of the rim of plate, so that plate will act only through its tooth hitting the notches of both trigger rods in quick succession, (8) on lever, a finger which, in the time-exposure position of lever, obtained in the other terminal position of rocker arm is placed on the path of tooth of the crank-plate, in such manner as to stop said plate after the first trigger rod has been released by action of the rim of plate upon the rocker arm finger, said crank-plate being subsequently releasable by the shaft of of the spiral cam being in frictional engagement with the operating lever so as to be driven by said lever on its return stroke as said lever is released by the operator, when said cam drives the rocker arm finger out of engagement with tooth, so that plate is released and may terminate its stroke and actuate second trigger rod for reclosing the shutter.

References Cited in the file of this patent

UNITED STATES PATENTS

| | | |
|---|---|---|
| 1,879,141 | Edwards | Sept. 27, 1932 |
| 2,335,439 | Nerwin | Nov. 30, 1943 |
| 2,753,776 | Smith | July 10, 1956 |